United States Patent [19]

Ma

[11] Patent Number: 5,588,007
[45] Date of Patent: Dec. 24, 1996

[54] METHOD FOR DETECTING TRANSIENT WRITE ERRORS IN A DISK DRIVE

[75] Inventor: Yiping Ma, Layton, Utah

[73] Assignee: Iomega Corporation, Roy, Utah

[21] Appl. No.: 639,176

[22] Filed: Apr. 26, 1996

[51] Int. Cl.⁶ .............................. G11C 29/00; G06F 7/02
[52] U.S. Cl. ..................... 371/21.2; 371/67.1; 360/53; 369/54; 369/58
[58] Field of Search ............................. 371/21.1, 25.1, 371/67.1, 71; 395/185.07, 183.18, 183.2, 184.01, 185.01; 369/47, 54, 58; 360/77.12, 31,53,75

[56] References Cited

U.S. PATENT DOCUMENTS

| | | | |
|---|---|---|---|
| 4,398,228 | 8/1983 | Bauck | 360/77 |
| 4,982,295 | 1/1991 | Yakuwa et al. | 360/77.04 |
| 5,371,638 | 12/1994 | Saliba | 360/77.12 |
| 5,377,058 | 12/1994 | Good et al. | 360/75 |
| 5,465,182 | 11/1995 | Ishikawa | 360/75 |
| 5,471,351 | 11/1995 | Ishiguro | 360/53 |

*Primary Examiner*—Hoa T. Nguyen
*Attorney, Agent, or Firm*—Woodcock Washburn Kurtz Mackiewicz & Norris

[57] ABSTRACT

A method for reducing write errors in a disk drive system is presented. When the flying height of a read/write head above a disk surface becomes to great the signal strength diminishes and data write errors will occur. Often, these increases in flying height are transient. Flying height increases are determined by detecting servo mark and sector information read errors. Recently written data is verified after detection of flying height induced errors.

13 Claims, 4 Drawing Sheets

METHOD FOR DETECTING TRANSIENT WRITE ERRORS IN A DISK DRIVE

FIELD OF THE INVENTION

This invention relates generally to storage subsystems for computer systems. In particular, this invention relates to methods for detecting errors during write operations in disk drives, especially those caused by transient increases in flying height.

BACKGROUND OF THE INVENTION

Maximizing the reliability of the data in disk drives is a key objective of disk drive designers. Unfortunately, that objective often conflicts with the similarly important need for performance. That is, by increasing the reliability performance measures, such as the data transfer rate, could suffer. For example, when data is written to the disk drive, the success of the write operation, i.e., whether the media accepted the data is unknown. One sure way to guarantee the success of a write operation is by re-reading the recorded data after each write operation. However, a technique that requires all data written to be read as well would severely degrade the performance of the drive. On the other hand, such verification would ensure high reliability of the data.

As explained above, these conflicting demands are particularly relevant during write operations. By contrast, if an error occurs during a read operation, the offending section of data can be re-read. However, errors occurring during write operations are more likely to result in permanent data loss.

Write errors are often transient. That is, if the error was detected and the write re-attempted the write would be successful. For example, write errors caused by dust particles might be corrected if re-attempted. Such contaminants could temporarily displace the recording mechanism, which results in an error during the write operation. Significantly, these transient write errors are particularly prevalent in removable media disk drives. Applicants have recognized that during the use of such removable media drives, the media is repeatedly removed and reinserted, increasing the likelihood of contaminants entering the cartridge.

Thus, there is a need for a method to detect transient write errors and to ensure a more reliable write operation while minimizing any performance penalty.

SUMMARY OF THE INVENTION

A method is presented for verifying the integrity of data written to a disk in a disk drive system that comprises the following steps.

A data section is written to disk. Periodically, during the write operation, a pre-recorded signal is read from the disk. If the pre-recorded signal is substantially different from a predetermined value, an error on the previous write may have occurred. Thus, the data section previously written to the disk is read back. If the data section read from the disk is substantially different from the data section that was intended to be written to the disk, an error condition results.

According to an aspect of the invention, if an error condition occurs the data section is re-written.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed.

In the drawings.

DETAILED DESCRIPTION OF THE INVENTION

A preferred embodiment of the invention will now be described with reference to the FIGS. 1–6. Those of ordinary skill in the art should appreciate that the description given herein with respect to those figures is for exemplary purposes only and is not intended in any way to limit the scope of the invention. For example, the number of sectors and servo marks used are merely to illustrate and are not intended to limit the invention.

Figure 1:
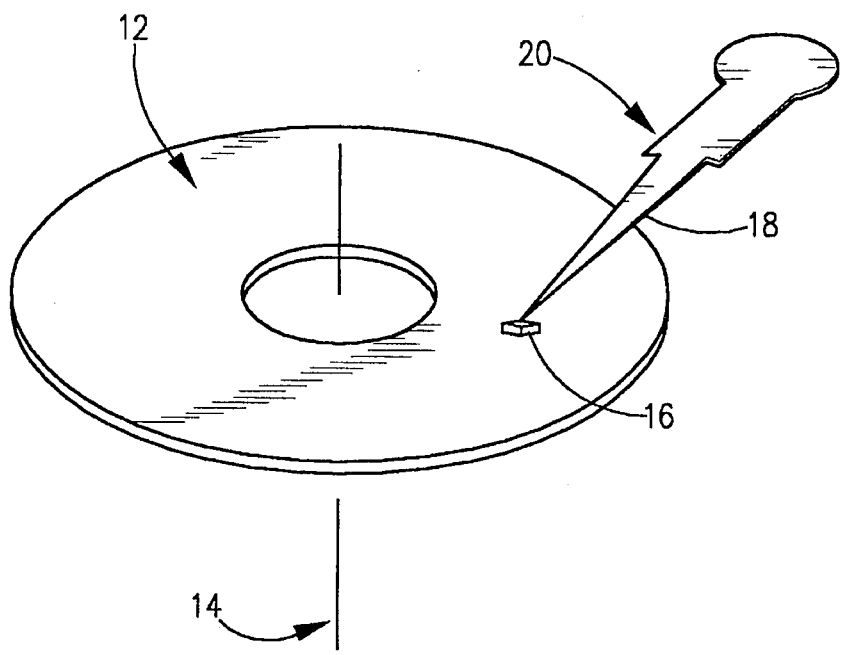
FIG. 1 is a diagram depicting an exemplary disk and arm assembly wherein the method of the present invention may be employed.

FIG. 1 is a representation of a disk drive mechanism wherein the operation of the present invention may be illustrated. As shown, a disk 12 rotates about a spindle motor axis 14. The surface of the disk 12 is receptive to electromagnetic signals for storing data. Read/write electronics, embedded within slider bearing 16 generates an electromagnetic signal to write data and read an electromagnetic signal from the disk surface to read data. The slider bearing 16 with embedded read/write electronics is also referred to herein as a read/write head 16. The read/write head 16 is attached to arm 18. The head 16 and arm 18 assembly are attached to suspension 20. To access selected data sections, the arm 18 with attached read/write head 16 moves over the surface of disk 12 both reading and writing data as required. Spring tension (not shown) urges the arm 18 and read/write head 16 against the surface of the disk 12. When the spindle motor (shown as spindle axis line 14) spins the disk 12 at full speed, air pressure develops between the read/write head 16 and the surface of disk 12 and lifts the read/write head 16 off of the surface of the disk 12. The gap that thereby develops between the surface of disk 12 and the read/write head 16 is referred to as the "flying height."

Figure 2:
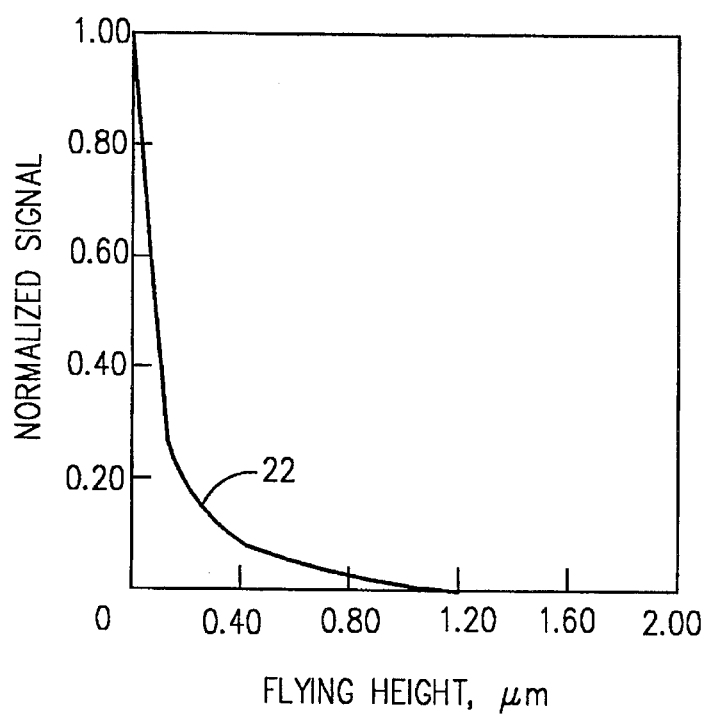
FIG. 2 is a chart illustrating the relationship between head flying height and signal strength.

FIG. 2, graphs the normalized strength of the electromagnetic signal on the disk surface versus the flying height of the read/write head 16. Line 22 plots the relationship between these two variables. Significantly, there is an inverse relationship between the two variables. Thus, increases in flying height correspond to decreases in normalized signal strength.

The flying height between the read/write head 16 and the surface of disk 12 reaches approximately between 0.04 and 0.1 μm, depending on the disk drive system, for a properly functioning full spinning disk 12. As illustrated in FIG. 2 by line 22, such a flying height corresponds to approximately 80 percent of the normalized signal strength. During a read operation, if the flying height increases, the signal read will weaken, possibly resulting in read errors. If the flying height increase is transient, the data section can be re-read and the data recovered. In other words, the signal on the surface of the disk 12 was written properly, but a transient increase in flying height caused the read/write head 16 to deviate too far from the surface to properly read the data. As illustrated in FIG. 2, as the flying height exceeds 0.4 μm the signal strength rapidly diminishes to zero.

Before data can be read or written to disk 12, that disk must be formatted. The format divides the surface of the disk 12 into tracks and subdivides those tracks into sectors. The surface of disk 12 is divided into tracks by pre-recording servo marks along each track. For example, there may sixty or more servo marks per track, i.e., a servo mark every six degrees. The read/write head 16 uses these servo marks during operation of the disk drive to locate tracks. Thereafter, the read/write head 16 can lock onto tracks by following the servo marks. During an additional format process, which may be separate from track formatting, the track is subdivided into sectors.

Figure 3:
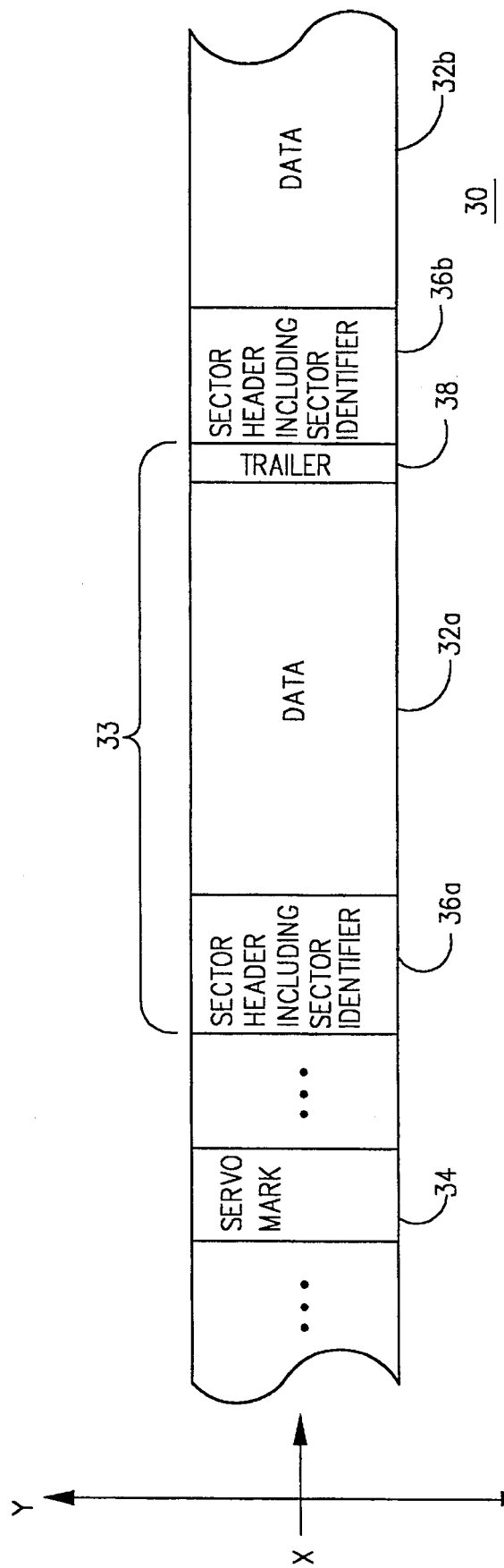
FIG. 3 is a graphical representation of an exemplary signal of a portion of data from the disk.

As shown in FIG. 3, each sector 33 is demarcated along the track with a header 36 and a trailer 38 that is recorded onto the disk surface. The header contains overhead information, such as constant density recording ("cdr") field (indicating how many bytes to the next servo field), track id field (identifying all sectors on the same logical track), sector id field (identifying a particular sector) and id error correction code field (containing an error correction code for cdr, track id and sector id fields). The number of sectors per track may vary, e.g., the innermost track may have 90 sectors per track, while the outermost track has 150 sectors per track. However, the number of servo fields remains the same for each track. For example, servo marks may appear every 6 degrees around each track. Servo marks contain a grey code (containing the physical track number), and norm and quad fields (indicating the head distance from the track center).

After disk 12 has been properly formatted, it is ready for use, such that data may be read from and written to its surface in data sections within each sector. While the read/write head 16 is reading and writing data to the disk 12, the arm 18 must follow the tracks that were written to the surface of the disk 12 during formatting. The arm 18 via the head 16 thus reads the servo marks to ensure that the tracks are closely followed during operation.

Significantly, during a write operation, the head 16 continues to read the servo marks to ensure proper track following and to read the sector identifiers to find the proper location for data. Additionally, during the write operation, the head continues to read every grey code, servo mark, id mark, cdr field and track id. The signal read back will translate to a specific predetermined value. If any of the value do not match the predetermined value, an error condition results. Also certain values are checked against the error correction code field. If a mismatch occurs the an attempt is made to correct the data using the error correction code field.

The norm and quad fields of the servo marks are checked against a predetermined amplitude. If a mismatch occurs a position error will be reported indicating how far the heads are from the center of the track.

As should be appreciated from FIG. 2, transient changes in head flying height during writes to disk 12 could result in a permanent signal loss. That is, as the flying height increases, the signal recorded on the media decreases. Thus, if the flying height crosses a threshold point, which may vary based on such factors as recording media and head type, the signal would not be recoverable on subsequent read operations. Unfortunately in such a case, the error may not be discovered until much later and permanent data loss could result.

A feature of the present invention detects and corrects write errors caused by transient increases in flying height with a minimal impact on drive performance. This feature exploits the need for the drive to continue to read information, such as servo marks, from the disk 12 even during write operations. Therefore, flying height increases that persist while the read/write head is flying above portions of the disk 12 having pre-recorded signals, such as a servo mark, are detected and corrected. In particular, since some information, such as servo marks, was written and verified prior to the use of the disk 12, read signal degradation detected during track following and sector seeking likely resulted from flying height increases. In a presently preferred embodiment of the present invention, the data previously written is re-read and verified. As a result, a high quality write operation can be performed while only verifying a minimal amount of data.

Figure 4:
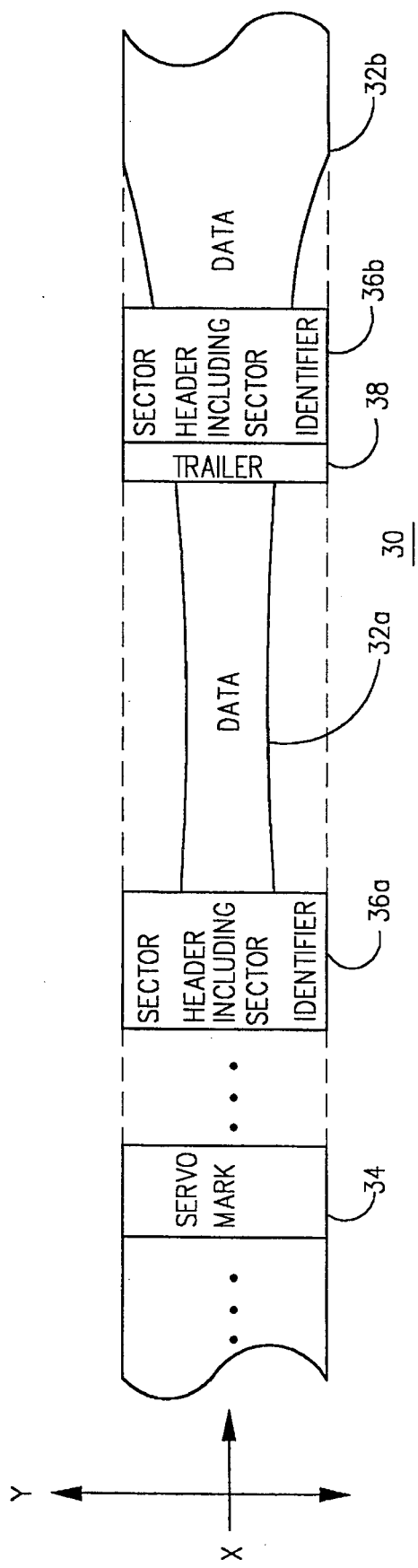
FIG. 4 is a graphical representation of the exemplary signal showing signal degradation in a track section caused by increased flying height.

To further illustrate the effect of transient increases in flying height during write operations, FIGS. 3 and 4 graphically present linear representations of track sections 30 from the disk 12. In both FIGURES, signal strength has been graphed along the y axis and time has been graphed along the x axis. Referring to FIG. 3, data sections 32a, 32b were written normally, i.e., while no changes in flying height were experienced. Significantly, the pre-recorded signals such as the servo mark 34, the sector headers 36a, 36b and the sector trailer 38 have substantially the same signal strength as the data sections recorded during subsequent write operations. By contrast, FIG. 4 presents a similar track section 30 written while experiencing a change in flying height. By comparison to the signal strength depicted in FIG. 3, the signal strength degrades in the data sections 32a, 32b of FIG. 4. That signal weakness corresponds to an increase in head flying height during the write operation. Importantly, even though the signal strength of the data 32a has diminished, the pre-recorded information, such as servo marks 34 and sector headers 36a, 36b remain at pre-recorded signal levels. As a result of the poor signal strength in the data sections 32a, 32b, the data recorded therein will likely be unreadable and unrecoverable if it remains uncorrected.

Figure 5:
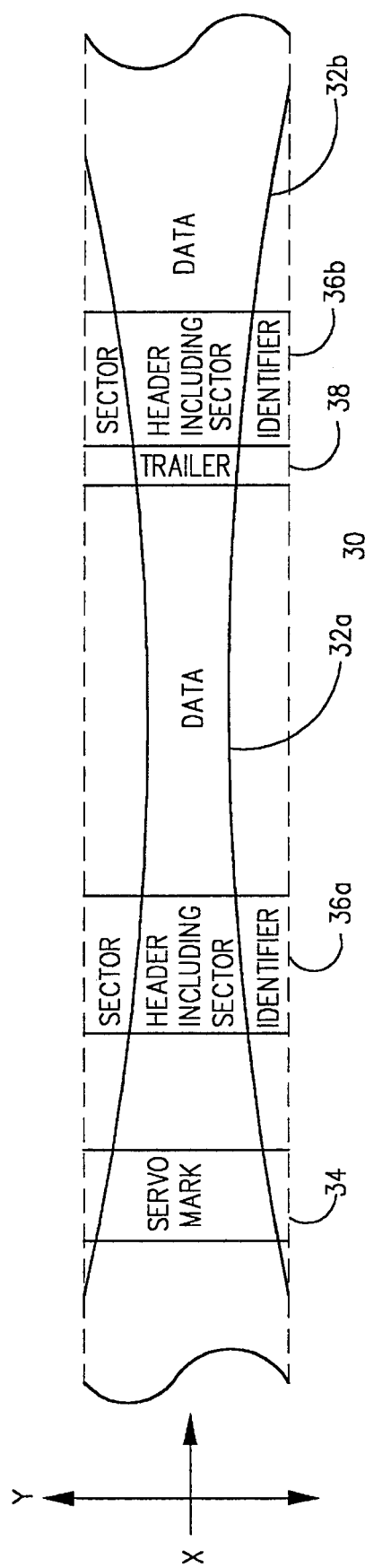
FIG. 5 is a graphical representation of the effect of flying height on reading and writing data; and, FIG. 6 is a flow chart of a presently preferred embodiment of the method of the present invention.

According to a presently preferred embodiment of the present invention, by testing the strength of the pre-recorded signal, e.g., servo marks 34 and sector identifiers (embedded within sector headers 36), while writing to the data sections 32, transient changes in flying height can be detected. Although the pre-recorded signals 34, 36, and 38 remain at pre-recorded signal strength, a read of those signals during the increase in flying height would likely result in diminished signal strength and read errors. As best illustrated in FIG. 5, while data is written to the disk 12, the read/write head 16 must constantly determine its current location. As noted above, this determination is conventionally performed by reading servo marks 34 and sector identifiers. Significantly, if such a read is made while experiencing an increase in flying height, those signals, e.g., 34, 36, will appear weak. Correspondingly, the write operation to data sections 32 will likely have resulted in a weak signal. Thus, an error detected on a read of the servo mark 34 and the sector identifier within the sector header 36a indicates that the nearby data 32a should be verified.

Figure 6:
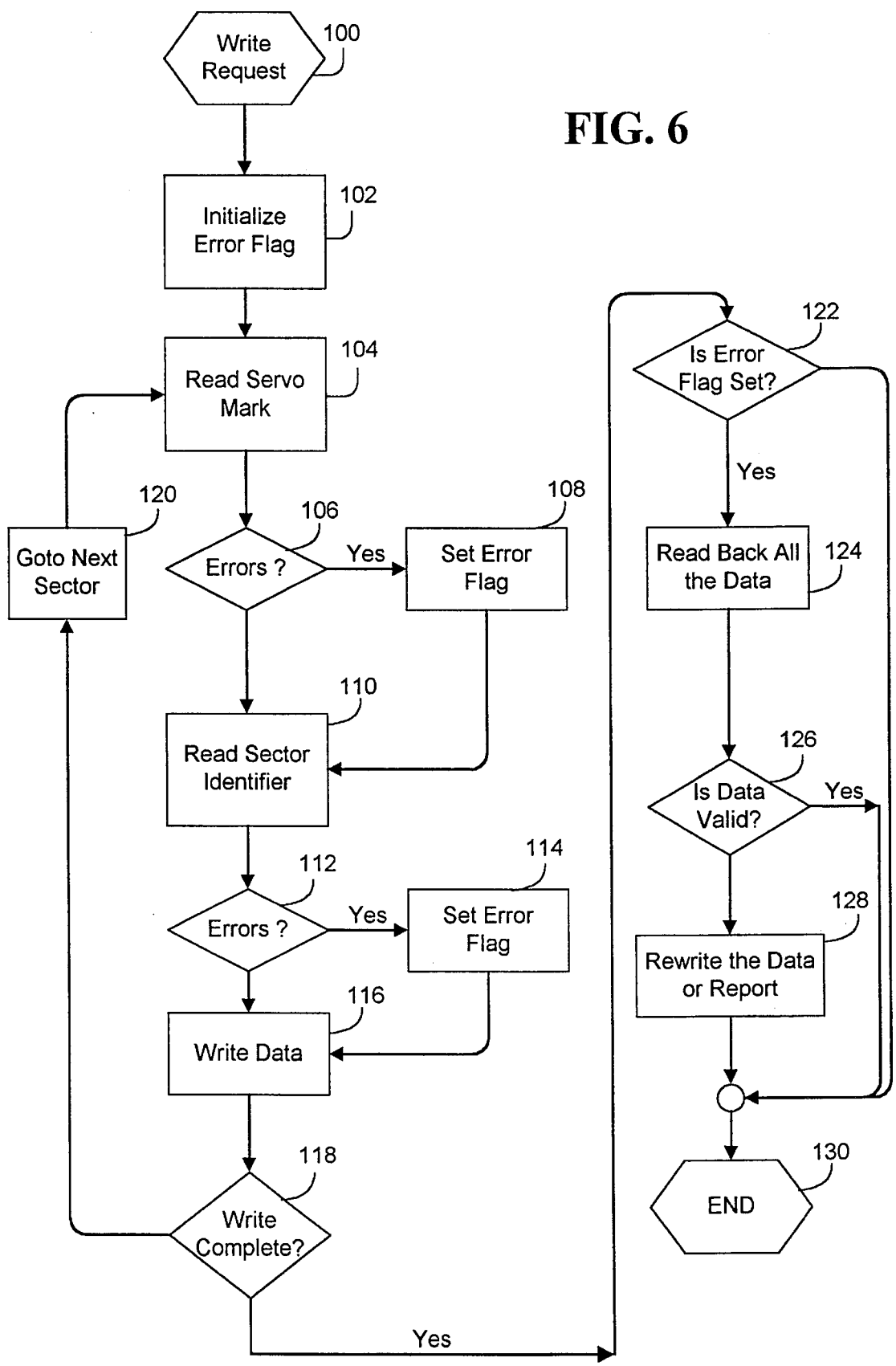

Referring now to FIG. 6, a presently preferred embodiment of the process of the present invention will be described in detail. The process begins with a request to write a block of data to the disk 12, starting at a particular track and sector location (Step 100). Before beginning the write, an error flag is initialized to zero (step 102). This flag is used, as will be further described below, to indicate whether a potential write error has occurred. After the initialization, the arm 18 moves the head 16 to the proper track by seeking to and following the servo marks. Thus, a servo mark is read (step 104). According to an aspect of the present invention, if the flying height of the head 16 is to high an error will occur during the read of the servo mark. Accordingly, the servo mark read is tested (step 106). If an error occurred during that read of the servo mark (step 104), the error flag is set. If, on the other hand, no error occurred, the process continues. Next, the head scans the track for the proper sector to receive the data. Accordingly, the sector identifier is read (step 110) o Any errors occurring during the read of the sector identifier result in the setting of the error flag. As with the servo mark read, excessive flying height during the read of the sector identifier will also result in a read error. Thus, the read of the sector identifier is tested for errors (step 112). If the read of the sector identifier resulted in an error, the error flag is set (Step 114).

According to the presently preferred embodiment, whether or not an error occurred during one of the reads indicated above, the data is written to the data section of the sector (step 116) (i.e., assuming the error is recoverable via an error correction code). If the write is not complete, i.e., more data remains to be written to different sectors, the process continues (steps 118, 120). Otherwise, the write is complete and the error flag is checked (steps 118, 122). If no read error occurred, the operation is complete. However, if the error flag is set indicating a read error, all the data previously written during this write request is read back for verification (step 124). As a final step in the event of an error, the sectors with faulty data are re-written or the error is reported (step 128).

Those skilled in the art will readily appreciate that many modifications are possible within the scope of the present invention. For example, the techniques described herein are not limited to completing the entire write operation before testing for errors, after detecting the read error verification could take place immediately. Moreover, other types of prerecorded data rather than the servo mark and the sector identifier may be used to test for flying height errors, those used herein are merely those that are presently preferred. Accordingly, the scope of the invention is not intended to be limited by the preferred embodiment described above but only by the appended claims.

What is claimed is:

1. A method of verifying the integrity of data written to a disk in a disk drive system, comprising the steps of:

(a) writing a first data section to a portion of the disk;
   (b) periodically reading a pre-recorded signal from the disk;
   (c) if said pre-recorded signal is substantially different from a predetermined value, reading the first data section written to the disk; and
   (d) if said first data section read from the disk is substantially different from said first data section written to the disk, generating an error condition.

2. A method as recited in claim 1 wherein the step of generating an error condition comprises the further step of re-writing the first data section to disk.

3. A method as recited in claim 1 wherein the step of generating an error condition comprises the further step of reporting an error condition.

4. A method as recited in claim 1 further comprising the step of preparing a disk with said prerecorded signal having a predetermined value.

5. A method as recited in claim 4 wherein said pre-recorded signal is a servo mark.

6. A method as recited in claim 4 wherein said pre-recorded signal is a sector identification.

7. A method as recited in claim 4 wherein said pre-recorded signal is at least one of a sector identification and a servo mark.

8. A method of selectively verifying data written to a disk in a disk drive system, comprising the steps of:

a) receiving a request to write data to disk;
   b) writing at least one portion of said data to disk;
   c) reading at least one signal arranged on said disk substantially subsequent to said at least one portion of said data such that an error reading said at least one signal indicates that the step of writing said at least one portion of said data may have been erroneous;
   (d) comparing said at least one signal to a predetermined value;
   (e) if said at least one signal is substantially different from said predetermined value, reading said first portion of said data;
   (f) comparing said at least one portion of said data read from the disk to a corresponding at least one portion of said data written to said disk; and,
   (g) if said at least one portion of said data read from said disk is substantially different from said corresponding at least one portion of said data written to said disk, generating an error condition.

9. A method as recited in claim 8 wherein said step of generating an error condition comprises the step of re-writing said at least one portion of said data to disk.

10. A method as recited in claim 8 wherein said step of generating an error condition comprises the step of generating a message indicating a write error.

11. A method as recited in claim 8 wherein said at least one signal is a servo mark.

12. A method as recited in claim 8 wherein said at least one signal is a sector identifier.

13. A method as recited in claim 8 wherein said at least one signal is at least one of a servo mark and a sector identifier.

* * * * *

UNITED STATES PATENT AND TRADEMARK OFFICE
CERTIFICATE OF CORRECTION

PATENT NO. : 5,588,007
DATED : December 24, 1996
INVENTOR(S) : Yiping Ma

It is certified that error appears in the above-indentified patent and that said Letters Patent is hereby corrected as shown below:

Column 5, line 19, after "(step 110 )" delete the "o" and insert a period "."

Signed and Sealed this

Eighteenth Day of March, 1997

*Attest:*

BRUCE LEHMAN

*Attesting Officer*     *Commissioner of Patents and Trademarks*